(12) United States Patent
Braun et al.

(10) Patent No.: US 10,180,891 B2
(45) Date of Patent: Jan. 15, 2019

(54) MONITORING PROCESSES RUNNING ON A PLATFORM AS A SERVICE ARCHITECTURE

(71) Applicant: SAP SE, Walldorf (DE)

(72) Inventors: Matthias Braun, Illingen (DE); Marc Becker, Mannheim (DE); Dietrich Mostowoj, Ludwigshafen (DE); Thomas Klink, Mörlenbach (DE); Steffen Schreiber, Frankenthal (DE); Marcel Merkle, Leimen (DE); Johannes Scheerer, Heidelberg (DE); Andreas Schoesser, Karlsruhe (DE); Elena Oresharova, Blagoevgrad (BG); Andreas Mueller, Brühl (DE); Andreas Steiner, Leimen (DE)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 15/341,658

(22) Filed: Nov. 2, 2016

(65) Prior Publication Data
US 2018/0121307 A1    May 3, 2018

(51) Int. Cl.
*G06F 9/44*     (2018.01)
*G06F 11/30*    (2006.01)
(Continued)

(52) U.S. Cl.
CPC ........ *G06F 11/3051* (2013.01); *G06F 3/0643* (2013.01); *G06F 11/302* (2013.01);
(Continued)

(58) Field of Classification Search
CPC ...................................................... G06F 11/30
See application file for complete search history.

(56) References Cited

U.S. PATENT DOCUMENTS 6,988,014 B2    1/2006    Kraemer et al.
7,930,149 B2    4/2011    Haag et al.
(Continued)

FOREIGN PATENT DOCUMENTS

| CN | 104 077 405 A | 10/2014 |
|---|---|---|
| WO | WO 2007/138599 A2 | 12/2007 |
| WO | WO 2016/046929 A1 | 3/2016 |

OTHER PUBLICATIONS

EPO Communication and extended European Search Report for related foreign application No. 17001118.3-1871; dated Oct. 9, 2017; 10 pages.

*Primary Examiner* — Hang Pan
(74) *Attorney, Agent, or Firm* — Fish & Richardson P.C.

(57) ABSTRACT

The present disclosure involves systems, software, and computer implemented methods for monitoring processes running on a platform as a service architecture. One example method includes storing a received sample of monitored attributes of a computer process in a sample memory buffer that includes other stored samples. A determination is made that the sample memory buffer is full. The sample memory buffer is compressed. A starting position in a compressed sample file store at which to store the compressed sample memory buffer is determined. The compressed sample memory buffer is stored at the determined starting position in the compressed sample file store. The starting position of the stored compressed sample memory buffer is stored at a particular location in a file position index. A collection timestamp for the sample in a timestamp index is stored at a timestamp index location that matches the particular location in the file position index.

17 Claims, 10 Drawing Sheets

(51) Int. Cl.
  *G06F 11/36* (2006.01)
  *G06F 17/30* (2006.01)
  *G06F 3/06* (2006.01)

(52) U.S. Cl.
  CPC .... *G06F 11/3664* (2013.01); *G06F 17/30091* (2013.01); *G06F 17/30138* (2013.01); *G06F 17/30321* (2013.01); *G06F 17/30551* (2013.01)

(56) References Cited

U.S. PATENT DOCUMENTS

| | | |
|---|---|---|
| 8,527,960 B2 | 9/2013 | Schmelter et al. |
| 8,584,098 B2 | 11/2013 | Schmelter et al. |
| 8,656,407 B2 | 2/2014 | Wintergerst et al. |
| 8,839,208 B2 | 9/2014 | Schmelter et al. |
| 8,850,403 B2 | 9/2014 | Wintergerst et al. |
| 8,959,477 B2 | 2/2015 | Mueller |
| 8,997,070 B2 | 3/2015 | Klemenz et al. |
| 9,117,019 B2 | 8/2015 | Wintergerst et al. |
| 9,129,056 B2 | 9/2015 | Schmelter et al. |
| 9,141,439 B2 | 9/2015 | Scheerer et al. |
| 9,201,759 B2 | 12/2015 | Wintergerst et al. |
| 9,280,444 B2 | 3/2016 | Scheerer et al. |
| 9,430,355 B2 | 8/2016 | Braun et al. |
| 2006/0037004 A1* | 2/2006 | Long .................. G06F 9/45504 717/127 |
| 2010/0082497 A1 | 4/2010 | Biesemann et al. |
| 2010/0241790 A1 | 9/2010 | Whang et al. |
| 2012/0047079 A1 | 2/2012 | Biesemann et al. |
| 2012/0072576 A1* | 3/2012 | Yumerefendi ...... G06F 11/3476 709/224 |
| 2013/0013605 A1 | 1/2013 | Stanfill |
| 2013/0046725 A1* | 2/2013 | Cammert .......... G06F 17/30516 706/52 |
| 2016/0224609 A1* | 8/2016 | Seekircher ........ G06F 17/30215 |
| 2017/0098010 A1 | 4/2017 | Kohinata et al. |

* cited by examiner

| Name | | Value type | Description |
|---|---|---|---|
| User CPU time | 402 | Integer (64bit) | The CPU time in user mode in milliseconds |
| System CPU time | 404 | Integer (64bit) | The CPU time in system mode in milliseconds |
| Native Memory size | 406 | Integer (64bit) | The number of bytes of reclaimed physical memory |
| Virtual Memory size | 408 | Integer (64bit) | The number of bytes of reclaimed virtual memory |
| Number open sockets | 410 | Integer (32bit) | The number of open network sockets |
| Number open files | 412 | Integer (32bit) | The number of open files sockets |
| Number of threads | 414 | Integer (32bit) | The number of threads |

| 436 | 422 | 424 | 426 | 428 | 430 | 432 | 434 |
|---|---|---|---|---|---|---|---|
| Timestamp | User CPU | System CPU | Physical memory | Virtual memory | Sockets | Files | Threads |

```
{
    "type": "object",                              500
    "properties": {
        "pid": {
            "type": "integer"
        },
        "parentPid": {
            "type": "integer"
        },
        "startedAt": {
            "type": "integer"
        },
        "attributes": {
            "type": "array",
            "items": {
                "type": "object",
                "properties": {
                    "name": {
                        "type": "string"
                    },
                    "size": {
                        "type": "integer"
                    },
                    "description": {
                        "type": "string"
                    }
                }
            }
        }
    }
}
```

FIG. 5

| Query parameters 702 | Time period 704 |
|---|---|
| toTS > fromTS > 0  706 | [fromTS, toTS)  710<br>Note: The interval may start and end in future. |
| fromTS > 0  712 | [fromTS, ∞)  714<br>Note: The stream is consumed as long as the client keeps it open. |
| toTS > 0  716 | (∞, toTS)  718<br>Note: The stream contains the currently taken samples and no historic data. |
| <none>  720 | Streams all currently taken samples as long as the client keeps the connection. |

FIG. 7

MONITORING PROCESSES RUNNING ON A PLATFORM AS A SERVICE ARCHITECTURE

TECHNICAL FIELD

The present disclosure relates to computer-implemented methods, software, and systems for monitoring processes running on a platform as a service architecture.

BACKGROUND

A Platform as a Service (PaaS) model can be used for network application development. A cloud provider can provide, to an application developer, hardware and software tools used for application development, using infrastructure located at or associated with the cloud provider. The application developer, as a user of PaaS, can use the infrastructure provided by the cloud provider rather than invest in purchasing and building such infrastructure on-premise at the application developer.

SUMMARY

The present disclosure involves systems, software, and computer implemented methods for monitoring processes running on a platform as a service architecture. One example method includes storing a received sample of monitored attributes of a computer process in a sample memory buffer that includes other stored samples. A determination is made that the sample memory buffer is full. The sample memory buffer is compressed. A starting position in a compressed sample file store at which to store the compressed sample memory buffer is determined. The compressed sample memory buffer is stored at the determined starting position in the compressed sample file store. The starting position of the stored compressed sample memory buffer is stored at a particular location in a file position index. A collection timestamp for the sample in a timestamp index is stored at a timestamp index location that matches the particular location in the file position index.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4A is a table that describes data that can be included in a monitoring sample collected for a process.

FIG. 4B illustrates an example monitoring sample record.

FIG. 5 is an example descriptor file that describes the format of monitoring samples for a process.

FIG. 7 is a table that illustrates formats of query parameters that can be received for requesting monitoring samples

DETAILED DESCRIPTION

A Platform as a Service (PaaS) system supports the execution of multiple applications and multiple instances per application. An application instance can start one or more child processes. Administrators may desire to monitor and troubleshoot application performance with regards to resource consumption by application processes of resources such as memory, processing time, disk use, and other resources.

A monitoring system can enable administrators to monitor historic and current resource consumption of instances and child processes associated with particular instances. Monitoring data provided by the monitoring system can enable an administrator to obtain information that may be used for scaling an application (e.g., determining a number of instances to use for the application) or for troubleshooting a problem with a particular application, a particular instance, or with the PaaS system in general, among others. An administrator can decide to halt, debug, or further profile an application instance based on review of monitoring data, for example.

The monitoring system can be configured to store historic monitoring data for a large number of instances for a predefined time period while efficiently storing the data within a predefined maximum amount of disk space available for storing monitoring data. The monitoring system can be configured to concurrently provide historic and online (e.g., live) monitoring data for a large number of instances in response to the receipt of multiple requests for monitoring data. As described in more detail below, data collected by the monitoring system can be made available as: 1) stored, historical data; 2) live, streamed data; or 3) a combination of stored, historical data and live, streamed data.

The monitoring system can be configured to achieve various performance goals. For example, a storage system used by the monitoring system can be configured so that new samples are able to be added in constant time. As another example, a retrieval system used by the monitoring system can be configured to be able to provide a stream of samples in logarithmic time based on a requested number of samples.

Figure 1:
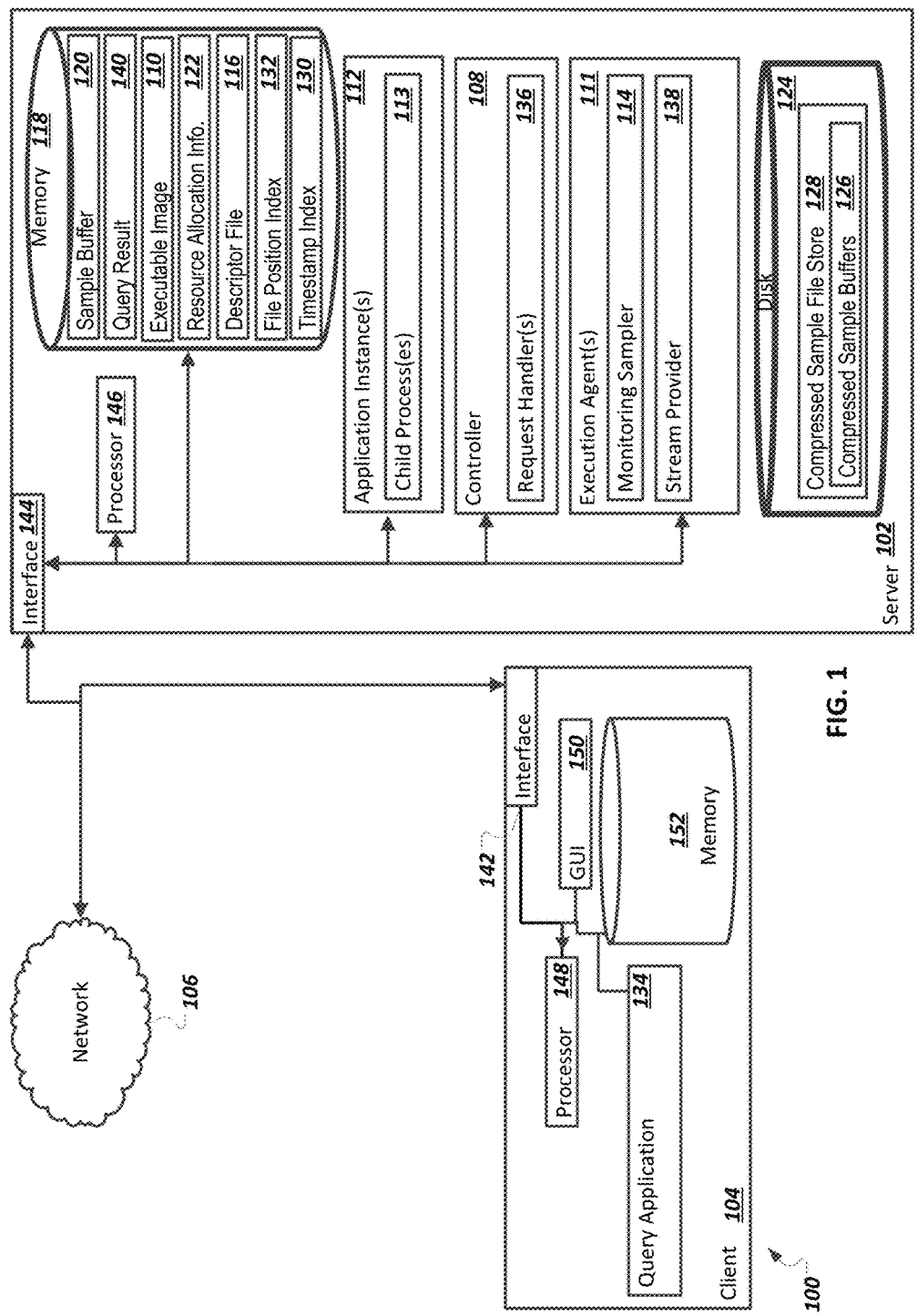
FIG. 1 is a block diagram illustrating an example system for monitoring processes running on a platform as a service architecture.

FIG. 1 is a block diagram illustrating an example system 100 for monitoring processes running on a platform as a service architecture. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

An administrator using the client device 104 can request execution of an application on the server 102. The server 102 can be a PaaS server, for example. A controller 108 (illustrated at the server 102) can receive application artifacts and can build an executable image 110 of the application. An execution agent 111 can use the executable image 110 to create one or more instances 112 of the application. A particular instance 112 can create one or more child processes 113.

The administrator can submit a request to the server 102 to collect monitoring data for the application, such as for future troubleshooting purposes. The administrator or a component of the server 102 (e.g., a monitoring sampler 114) can identify or generate a descriptor file 116 that describes monitoring data to be collected. The monitoring sampler 114 can collect data for each instance of the application, including any child processes created by an instance. In some instances, the monitoring sample 114 may collect data for fewer than all instances of the application, where directed or for any suitable reason. The monitoring sampler 114 can collect a sample of monitoring data for a process and store the sample in memory 118 in a sample buffer 120. The monitoring sampler 114 can query the operating system of the server 102 to obtain some or all monitoring data. Collected monitoring data can be based on resource allocation information 122 that can be obtained for a process.

The monitoring sampler 114 can collect other samples, such as on a periodic basis (e.g., every thirty seconds) and store the collected samples in the sample buffer 120. The monitoring sampler 114 can determine when the sample buffer 120 is full, and can compress a full sample buffer 120 and store the compressed sample buffer on disk storage 124 among other compressed sample buffers 126 in a compressed sample file store 128. As described in more detail below, the monitoring sampler 114 can store retrieval information for the compressed sample buffer in a timestamp index 130 and a file position index 132, for efficient retrieval in response to a query for monitoring data. In some implementations, the file position index 132 and the timestamp index 130 are also or alternatively stored in the disk storage 124. As another example, the timestamp index 130 and/or the file position index 132 can be recalculated from the compressed sample file store 128, e.g., upon system startup.

The administrator may, for example, desire to troubleshoot an issue that occurred with an application instance at a particular point in time. The administrator can submit a monitoring data query to the server 102 using a query application 134. The monitoring data query can be received by a request handler 136 in the controller 108, for example. The monitoring data query can indicate the application instance and a time range for which monitoring data is requested.

The request handler 136 can forward the monitoring data query to a stream provider 138 associated with the execution agent 111 associated with the application instance. The stream provider 138 can determine whether the monitoring data query is for historical data, live (current) data, future data, or some combination of historical, live, and future data. If the monitoring data query is at least in part for historical data, the stream provider 138 can look up retrieval information in the timestamp index 130 based on the time range specified in the monitoring data query, identify corresponding retrieval information in the file position index 132, retrieve one or more compressed sample buffers 126, decompress the compressed sample buffers 126, and place the decompressed sample buffers in a query result 140. If the monitoring data query is only for historical data, the query result 140 can be returned to the client 104.

If the monitoring data query is at least in part for live data, the stream provider 138 can generate a stream of sample buffers as they are collected and provide the stream to the client device 104. If the monitoring data query is for a future date, the stream provider 138 can determine when the future date occurs and provide a stream of monitoring samples at that time.

As described in more detail below, the server 102 can collect, retrieve, and provide monitoring data to the client 104 in an efficient manner, and can provide a same interface and a same type of stream of monitoring data to the client 104, regardless of whether the monitoring data query is for historical, live, or future data. For example, streamed data can be appended to the query result 140 and can be provided to the client 104 as a single stream. The administrator does not have to submit multiple, separate queries for historical and live data, for example, or process different results from multiple, separate queries.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™ OS, Android™, iOS or any other suitable operating system. According to one implementation, the server 102 may also include or be communicably coupled with an e-mail server, a Web server, a caching server, a streaming data server, and/or other suitable server.

Interfaces 142 and 144 are used by the client device 104 and the server 102, respectively, for communicating with other systems in a distributed environment—including within the system 100—connected to the network 106. Generally, the interfaces 142 and 144 each comprise logic encoded in software and/or hardware in a suitable combination and operable to communicate with the network 106. More specifically, the interfaces 142 and 144 may each comprise software supporting one or more communication protocols associated with communications such that the network 106 or interface's hardware is operable to communicate physical signals within and outside of the illustrated system 100.

The server 102 includes one or more processors 146. Each processor 146 may be a central processing unit (CPU), a blade, an application specific integrated circuit (ASIC), a field-programmable gate array (FPGA), or another suitable component. Generally, each processor 146 executes instructions and manipulates data to perform the operations of the server 102. Specifically, each processor 146 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 118. In some implementations, the server 102 includes multiple memories. The memory 118 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the query application 134. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 148. Each processor 148 included in the client device 104 may be a central processing unit (CPU), an application specific integrated circuit (ASIC), a field-programmable gate array (FPGA), or another suitable component. Generally, each processor 148 included in the client device 104 executes instructions and manipulates data to perform the operations of the client device 104. Specifically, each processor 148 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 150.

The GUI 150 of the client device 104 interfaces with at least a portion of the system 100 for any suitable purpose, including generating a visual representation of the query application 134. In particular, the GUI 150 may be used to view and navigate the various Web pages, or other user interfaces. Generally, the GUI 150 provides the user with an efficient and user-friendly presentation of business data provided by or communicated within the system. The GUI 150 may comprise a plurality of customizable frames or views having interactive fields, pull-down lists, and buttons operated by the user. The GUI 150 contemplates any suitable graphical user interface, such as a combination of a generic web browser, intelligent engine, and command line interface (CLI) that processes information and efficiently presents the results to the user visually.

Memory 152 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 152 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
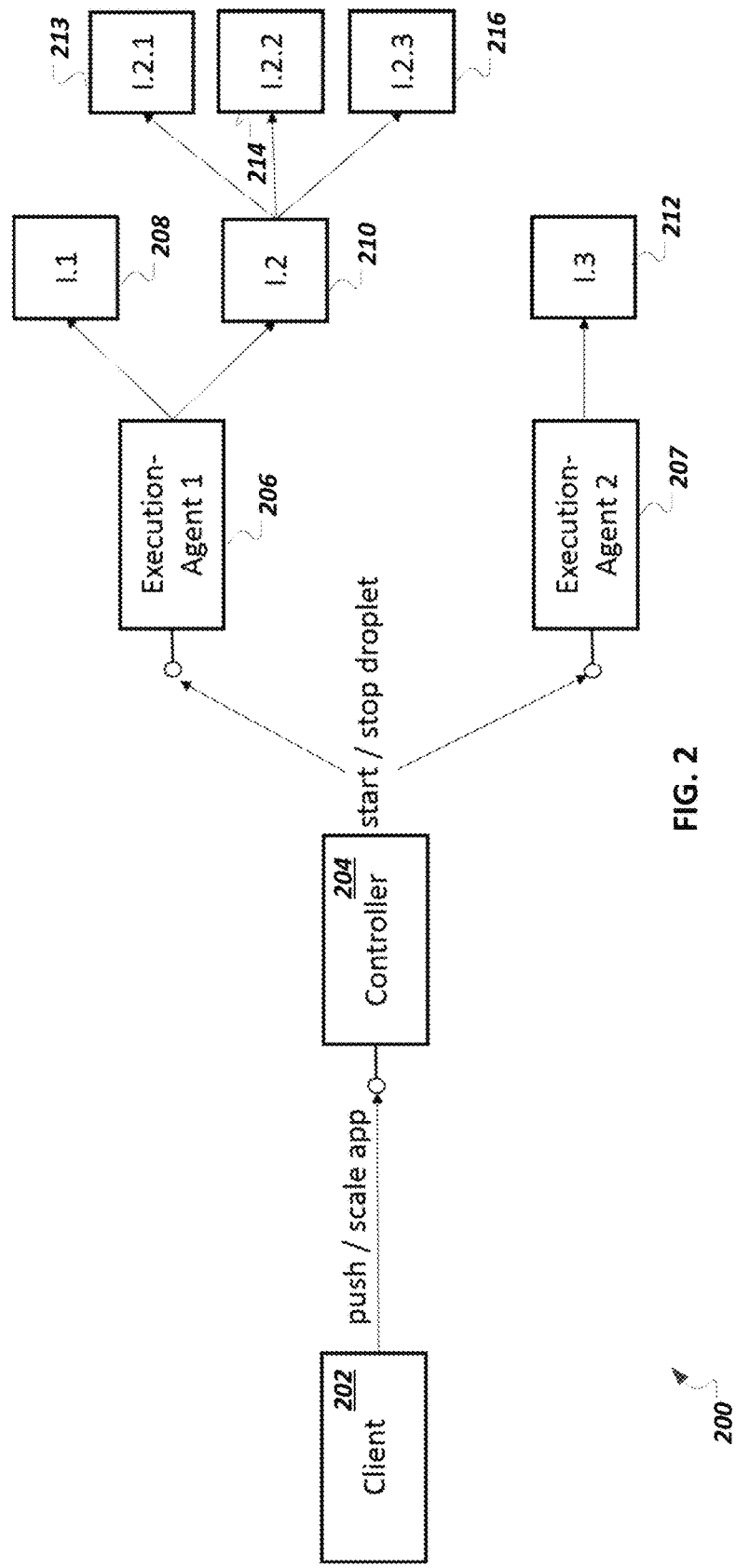
FIG. 2 is a block diagram illustrating an example platform as a service system.

FIG. 2 is a block diagram illustrating an example platform as a service system 200. The PaaS system 200 can support the development and operation of micro-service oriented applications by providing a set of generic services such as persistency, user identity management, and other services. To deploy an application in the PaaS system 200, a user can use a client device 202 to push application artifacts to a controller 204. The controller 204 can provide a HTTP/REST (HyperText Transfer Protocol/REpresentational State Transfer) interface to the client 202, for example.

The controller 204 and/or other components of the PaaS system 200 can, using the received application artifacts, build an executable image (e.g., referred to as a "droplet") of a complete runtime stack for the application, including additional services provided by the PaaS system 200 (e.g., for logging, user management, SSL (Secure Sockets Layer) support, etc.). The executable image for an application can be provided to an execution agent, such as an execution agent 206 or 207. The controller 204 can communicate with execution agents using one or more internal HTTP/REST interfaces, for example. The controller 204 and a given execution agent 206 or 207 can be on a same or different host.

A given execution agent 206 or 207 associated with the controller 204 can initiate execution of one or more instances of an application that is associated with the given execution agent 206 or 207. For example, the execution agent 206 can initiate execution of one or more instances of a first application. The execution agent 206 can initiate execution of a first instance 208 of the first application and a second instance 210 of the first application, for example. As another example, the execution agent 207 can initiate execution of one or more instances of a second application. For example, the execution agent 207 can initiate execution of an instance 212 of the second application.

An application instance can initiate execution of one or more child processes. For example, the second instance 210 of the first application can initiate execution of a first child process 213, a second child process 214, and a third child process 216 in association with execution of the second instance 210.

Processes, including the application instances 208, 210, and 212, and child processes 213, 214, and 216, can consume operating system resources such as CPU time, memory, files, sockets, and other types of resources. As described in more detail below, process resource use can be monitored and monitoring data describing the resource use can be stored and made available to requesters of monitoring data, such as to troubleshoot problems occurring with the system 200.

Figure 3:
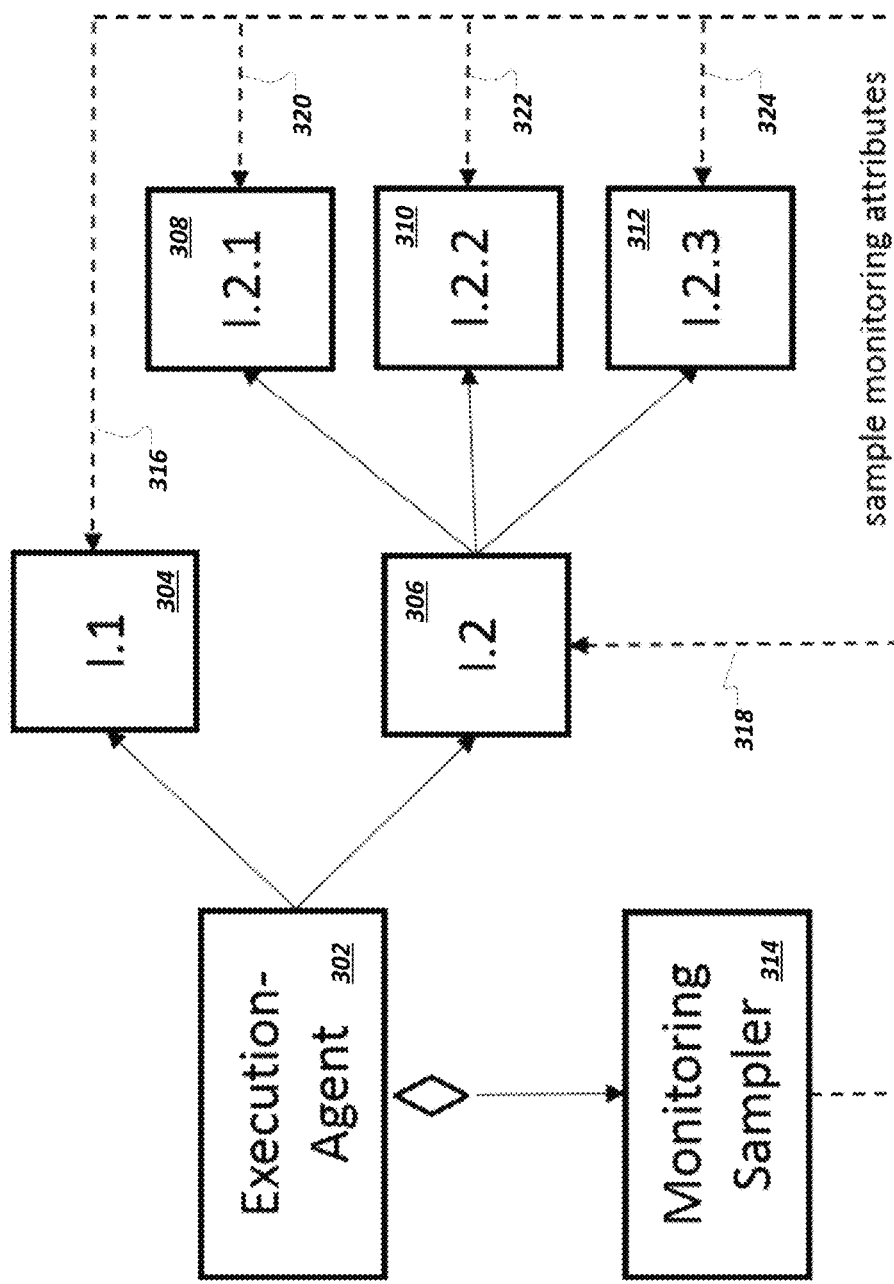
FIG. 3 is a block diagram illustrating an example monitoring system.

FIG. 3 is a block diagram illustrating an example monitoring system 300. An execution agent 302 initiates a first instance 304 and a second instance 306 of an application. The second instance 306 initiates execution of a first child process 308, a second child process 310, and a third child process 312 in association with execution of the second instance 306.

A monitoring sampler 314 associated with the execution agent 302 collects monitoring samples associated with the first instance 304 (as illustrated by an arrow 316), the second instance (as illustrated by an arrow 318), and the first child process 308, the second child process 310, and the third child process 312 (as illustrated by arrows 320, 322, and 324, respectively). As described in more detail below, data collected by the monitoring sampler 314 can be made available as: 1) stored, historical data; 2) live, streamed data; or 3) a combination of stored, historical data and live, streamed data.

A monitoring sample for a process is a set of attributes that reflect the state of the process at a specific point of time. Monitoring data for a process can be a stream of monitoring samples collected for the process with increasing timestamps. The monitoring sampler 314 can collect attributes, for example, by interfacing with the operating system of the host on which the process runs. The monitoring sampler 314 can periodically collect a monitoring sample for each running instance as well as for any child processes for the instance. In some implementations, a sample rate (e.g., thirty seconds) can be defined within the monitoring system 300 (e.g., as a global, pre-defined constant). If the execution agent 302 starts the first instance 304 or the second instance 306 within a container, a monitoring agent (not shown) can reside within the container, collect samples locally within the container, and forward samples to the monitoring sampler 314.

FIG. 4A is a table 400 that describes data that can be included in a monitoring sample collected for a process. A user CPU time field 402 can store a CPU time used by the process in a user mode as a milliseconds value. A system CPU time field 404 can store a CPU time used by the process in a system mode as a milliseconds value. A native memory size field 406 can store a number of bytes of reclaimed physical memory used by the process. A virtual memory size field 408 can store a number of bytes of reclaimed virtual memory used by the process. A number of open sockets field 410 can store a number of open network sockets used by the process. A number of open files field 412 can store a number of open files used by the process. A number of threads field 414 can store a number of threads associated with the process.

FIG. 4B illustrates an example monitoring sample record 420. The monitoring sample record 420 includes fields 422, 424, 426, 428, 430, 432, and 434 that correspond to the fields 402, 404, 406, 408, 410, 412, and 414, respectively. The monitoring sample record 420 also includes a timestamp field 436 that can store a timestamp value indicating a time at which a given sample was collected. The monitoring sample record 420 can be represented in memory or on disk by an array of bytes with fixed attribute positions that can be reconstructed using a descriptor file.

FIG. 5 is an example descriptor file 500 that describes the format of monitoring samples for a process. Different descriptor files can be used for different applications. As another example, a same descriptor file can be used in association with multiple, different applications, when a same type of data is collected for processes of the different applications. In some implementations, different descriptor files can be used for different instances of a same application. The descriptor file 500 can be in a JSON (JavaScript Object Notation) format or some other type of format.

The descriptor file 500 includes a properties collection 502 that includes a process id field 504 ("pid") that identifies a process for which samples are being collected, a parent process id field 506 ("parentPid") that identifies a parent process if the process is a child process, and a timestamp field 508 ("startedAt") that indicates when a given sample was collected. The properties collection 502 includes an attributes collection 510 that corresponds to collected sampling data. The order of items in the attributes array given in the descriptor define the format of a single monitoring sample in collected by a monitoring sampler. Each attribute in the attributes collection 510 is described by a name 512, a size 514, and a description 516. The attributes in the attributes collection 510 can be as described above with respect to FIG. 4A, or can be some other collection of attributes.

Figure 6:
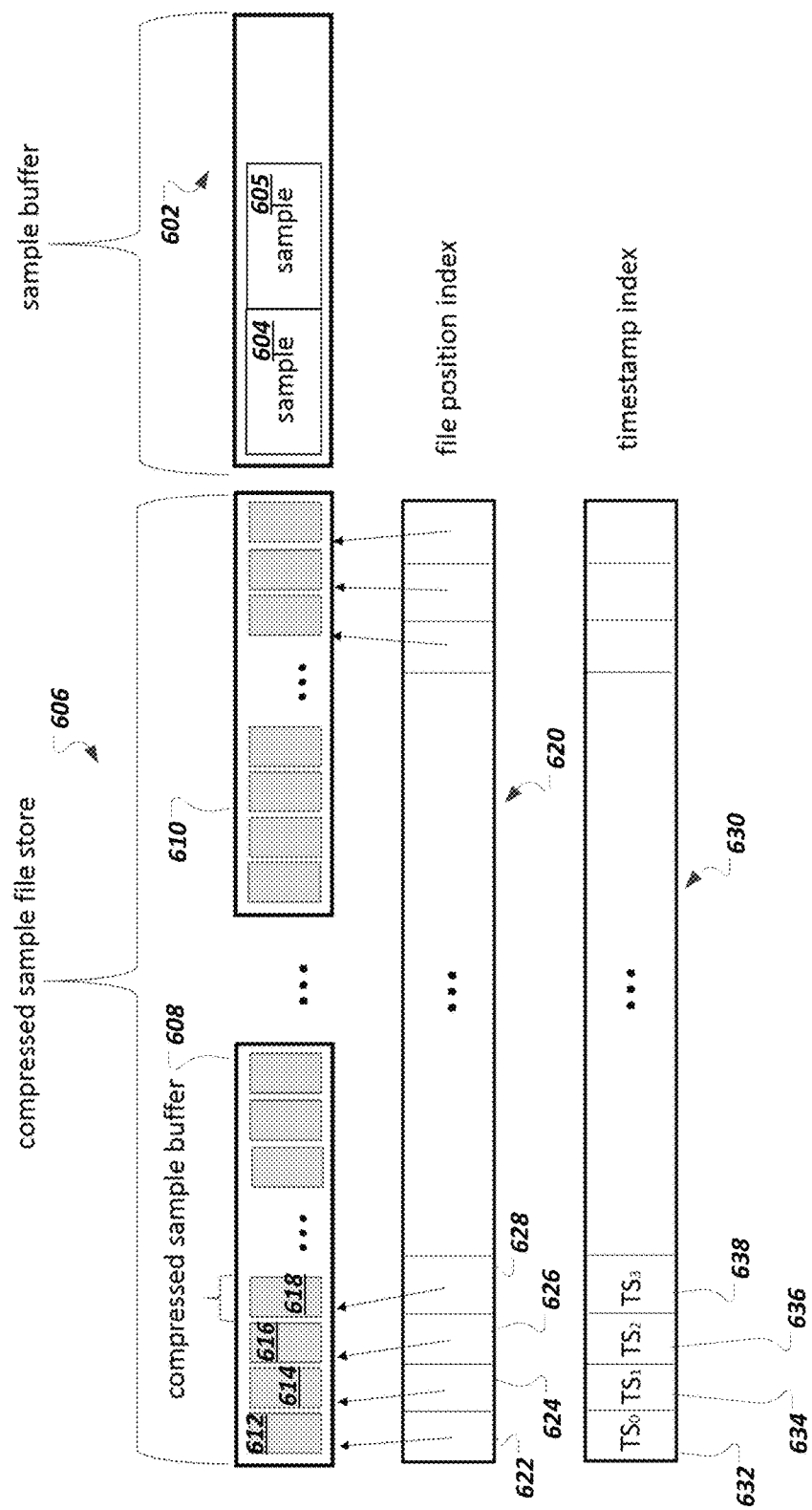
FIG. 6 illustrates buffers and indices that can be used to store and retrieve sampling data collected for a process.

FIG. 6 illustrates buffers and indices that can be used to store and retrieve sampling data collected for a process. A sample buffer 602 stores samples 604, 605, and possibly other samples. A compressed sample file store 606 stores compressed sample buffers in one or more files. For example, a file 608 stores compressed sample buffers 612, 614, 616, 618, and other compressed sample buffers. A file 610 stores other compressed sample buffers.

A file position index 620 stores location values that can be used to locate a particular compressed sample buffer within a particular file 606 or 608. For example, the file position index 620 stores location values 622, 624, 626, and 628 in the first, second, third, and fourth positions of the file position index 620, corresponding to the compressed sample buffers 612, 614, 616, and 618, respectively.

A timestamp index 630 stores timestamp values that are associated with stored compressed sample buffers. Timestamp values 632, 634, 636, and 638 respectively correspond to the location values 622, 624, 626, and 628, and to the compressed sample buffers 612, 614, 616, and 618, with each respective timestamp value indicating a time at which a first sample in the respective compressed sample buffer was collected.

As mentioned, the sample buffer 602 and the compressed sample file store 606 are for storage of sampling data for a particular process. Other sample buffers and compressed sample file stores can exist for other processes for which sampling data is stored. Each file 608, 610 in the compressed sample file store 606 can have a maximum predetermined size (e.g., 10 megabytes). The maximum predetermined size of a file can be the same for all processes or different for different processes, different instances, or different applications. In some implementations, a maximum overall size of the compressed sample file store 606 can be established (e.g., 100 megabytes). Each compressed sample file store 606 can be a cyclical, rotating storage area in which oldest data is removed when capacity is reached, to make room for a newest set of data. The sample buffer 602 can have a predetermined, maximum size (e.g., 16 kilobytes). In some implementations, the sample buffer 602 is periodically copied to disk, for recovery purposes in the case of a system crash.

In further detail of the storing of samples, storage efficiency operations can be performed when samples are collected. For example, if the sample buffer 602 is empty when a sample has been collected, the collected sample can be directly copied to position 0 of the sample buffer 602. If the sample buffer 602 is not empty when a sample has been collected, a byte array resulting from a bitwise XOR operation with the collected sample and the previous sample's byte array representation can be copied to the sample buffer 602. The XOR operation can result in the nullifying of most of the bytes in the byte array result of the XOR operation, as all values in the same positions of the collected sample and the previous sample typically only vary in the lower byte positions. When the limit of the sample buffer is reached, the complete sample buffer 602 can be compressed and appended to the compressed sample file store 606 (e.g., in the file 608 or the file 610). A zip compression algorithm or some other compression algorithm can be used for compression.

After a given compressed sample buffer is stored, a write position of the sample buffer 602 can be reset to zero. When a compressed sample buffer is stored, the timestamp of a starting sample of the compressed sample buffer can be appended to the timestamp index 630. The starting position of the compressed sample buffer within the compressed sample file store 606 can be appended to the file position index 620. In some implantations, periodic maintenance of the file position index 620 and the timestamp index 630 is performed, such as in response to entries being added at the last positions in the respective indices. For example, the file position index 620 and the timestamp index 630 can be maintained as rolling indices.

If a compressed sample buffer does not fit into a current file of the compressed sample file store 606, the compressed sample buffer can be stored in a next file. For example, if the sample buffer 602 is compressed into a newest compressed sample buffer, and the file 608 is full, the newest compressed sample buffer can be stored in the file 610. If the maximum number of files are reached (e.g., all files are full), the newest compressed sample buffer can be written to a new file which can become the new head of the compressed sample file store 606 and an oldest file of the compressed sample file store 606 can be deleted.

FIG. 7 is a table 700 that illustrates formats of query parameters that can be received for requesting monitoring samples. A controller (e.g., the controller 204 described above with respect to FIG. 2) can receive a query for sampling data, for example. The table 700 includes a query parameters column 702 which includes formats of query parameters that may be received and a time period column 704 that describes a time period for which samples are to be returned in response to receipt of a query having a particular format. A query for monitoring data can include an application identifier, an instance identifier, a process identifier, and a set of one or more time range related query parameters in one of the query formats included in the query parameters column 702.

The formats in the query parameters column 702 enable the query submitter to request historical data, live data, or a combination of historical and live data. For example, a query can be received in a format 706 that includes a "to" timestamp ("toTS", to-timestamp) and a "from" timestamp ("fromTS", from-timestamp), with the to-timestamp being greater than the from-timestamp and both the to-timestamp and the from-timestamp being greater than zero. In response to receiving a query matching the format 706, monitoring samples collected within the range starting at a time corresponding to the to-timestamp and ending at a time corresponding to the from-timestamp can be returned (e.g., a time period 710 corresponding to a range of "[fromTS, toTS]").

Regarding the format 706, various combinations of the to-timestamp and the from-timestamp can correspond to dates that are either in the future or in the past. For example, if both the to-timestamp and the from-timestamp are in the past, historical monitoring samples corresponding to the range [fromTS, toTS} can be returned.

As another example, if the from-timestamp is in the past and the to-timestamp is in the future, historical data starting from the from-timestamp up to the time of the query can be returned. Additionally, live data can be streamed to the submitter of the query starting at the time of the query until a time corresponding to the to-timestamp. The returning of historical data and the streaming of live data can be performed so that no gap exists between the returned historical data and the streamed live data (e.g., no missing samples collected from the [fromTS, toTS} range).

Live data and historical data can be returned in a single stream. The submitter of the query can process the single stream as a single source of data that includes both retrieved historical data and streamed live data. The submitter of the query can process the single stream of data without having to do any actions for combining the data or synchronizing the starting of the live streaming with the returning of the historical data so as to not miss any data samples.

As yet another example of timestamps, both the from-timestamp and the to-timestamp can be in the future. For such a query, when a time corresponding to the from-timestamp is reached, live data can be streamed to the submitter of the query until a time corresponding to the to-timestamp.

A query can be received in a query format 712, with the query including a from-timestamp that is greater than zero. The query format 712 represents a request to "stream from the given from-timestamp." In response to receiving a query in the query format 712, monitoring samples collected starting at a time corresponding to the from-timestamp can be returned.

The from-timestamp included in the query format 712 can correspond to a date in the past or in the future. If the from-timestamp is a date that is in the past, historical data starting from a time corresponding to the from-timestamp up to the time of the query can be returned. Additionally, live data can be streamed to the submitter of the query starting at the time of the query until the submitter closes the stream. As described above, the live data can be appended to the historical data in a same stream. If the from-timestamp is in the future, live data is streamed to the user starting at a time corresponding to the from-timestamp. Live data can be continued to be streamed until the submitter closes the stream. A time period 714 for data returned from a query having the query format 712 can be represented as a range of "[fromTS,∞}", with the infinity symbol meaning "streaming indefinitely", e.g., until the submitter closes the stream.

A query can be received in a query format 716, with the query including a to-timestamp that is greater than zero. The query format 716 represents a request to "stream until the given to-timestamp". The to-timestamp corresponds to a time in the future. In response to receiving a query in the query format 716, live data is streamed until a time corresponding to the to-timestamp is reached. A time period 718 for streaming can be represented a range of "[∞, toTS]".

A query format 720 of "<none>" represent a query for which no to-timestamp and no from-timestamp is included. A query with no to-timestamp and no from-timestamp can be interpreted as a request to stream live data indefinitely until the submitter closes the stream.

A controller can provide a HTTP/REST interface for requesting monitoring data. A request can be of the form "/v2/applications/{appId}/{instanceId}/monitoring?fromTS=from &toTS={to}", where appId is a unique identifier of a deployed application and instanceId is a unique identifier of a requested instance. The "{from}" and "{to}" values represent optional integer parameter values, which can in formats and combinations be as described above for the query parameters 702. Each "{from}" or "{to}" value can represent a number of milliseconds in UNIX time, for example, or some other representation of time. A request can also include a process identifier, as well as an instance identifier. For example, a request can be of the form "/v2/applications/{appId}/{instanceId}/{Pid}/monitoring?fromTS={from}&toTS={to}".

In response to a request, a stream of monitoring samples of the instance can be provided during the specified period of time. The monitoring samples in the stream can be in JSON format or some other format. The REST operation can be an asynchronous operation, meaning that the stream of monitoring samples provided in response to the request can be provided consecutively even after an initial result stream is returned as a response to the request. A result stream can be closed when either all requested samples are transferred (e.g., a to-timestamp is reached) or the client decides to finish listening to the stream. A stream may start with historic samples and then continue with samples that are taken subsequent to the request.

In some implementations, an interface can be provided for requesting monitoring data for an entire application (e.g., all monitoring data collected by a given execution agent). Each execution agent can provide an asynchronous HTTP/REST request interface with similar semantics as the HTTP/REST request interface provided by the controller. A request sent to a particular execution agent can have a format of "/v2/instances/{instanceId}/monitoring?fromTS={from}&toTS={to}", for example.

For each request, a dedicated stream provider instance can be started in the execution agent which is responsible for providing the samples. When a from-timestamp is a timestamp in the past, the stream provider can look up a first sample in the compressed sample file store that has a timestamp that is greater or equal to the from-timestamp. The retrieval of the first sample can be achieved in logarithmic time with respect to the total number of samples.

For example, if the first sample in the current sample buffer has a timestamp less than or equal to the from-timestamp, the buffer can be iterated while gathering samples by cumulatively adding (e.g., using an XOR operation) difference samples to the first sample with absolute values until a sample is reconstructed which has a timestamp greater or equal to the from-timestamp. The reconstructed sample and samples collected after the reconstructed sample can be streamed by the stream provider.

Otherwise, if the first sample in the current sample buffer does not have a timestamp less than or equal to the from-timestamp, a binary search in the timestamp index can be performed to search for an index of a compressed buffer whose starting sample has a minimum timestamp greater than or equal to the from-timestamp. A corresponding entry in the file position index array at the same index as the index found in the timestamp index can provide a starting file position of the desired compressed sample. The found compressed buffer can be uncompressed and samples can be reconstructed (e.g., using an XOR operation) before reconstructed samples are streamed by the stream provider. Consecutive compressed buffers and consecutive files can be processed similarly if they relate to the timeframe of the request. If all files have been processed, samples from the uncompressed sample buffer can be provided to the stream.

After the stream provider has consumed all historic data, the stream provider can act as a listener for a monitoring sampler to get notified when new samples are taken. New samples can be directly forwarded to the stream. Before writing a sample to a stream, a sample can be converted to a JSON format that includes the sampled attributes as properties as well as a timestamp, process identifier, and parent process identifier. If an instance has one or more child processes, multiple stream providers serving the different processes can be created. All stream providers for an instance can write to a same stream.

Figure 8:
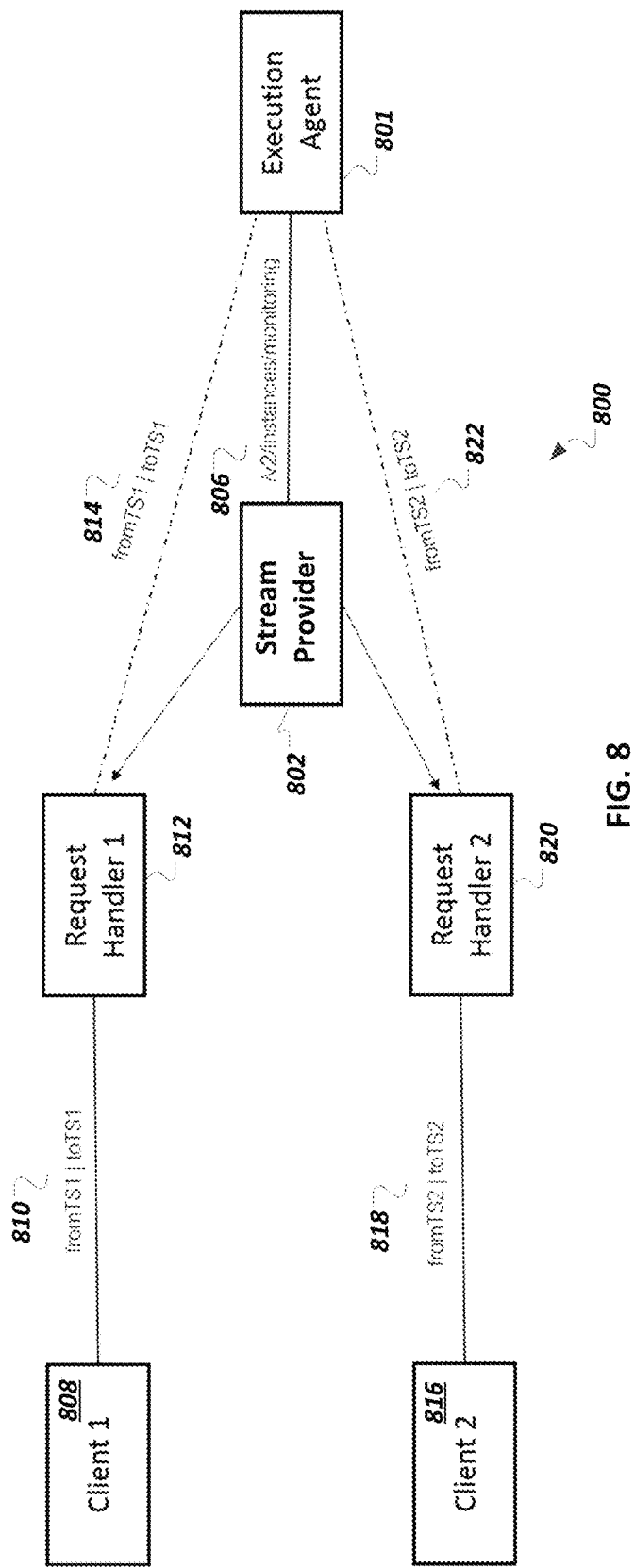
FIG. 8 illustrates a system for the streaming of monitoring samples.

FIG. 8 illustrates a system 800 for the streaming of monitoring samples. In some implementations, an execution agent 801 is associated with a single stream provider 802 which accepts a single stream 806 of monitoring data from the execution agent 801. The execution agent 801 can stream data to the stream provider 802 in response to a request for live monitoring data. For example, a first client 808 can send a request 810 (including a first from-timestamp "fromTS1" and a first to-timestamp "toTS1") to a controller (not shown). A first request handler 812 included in the controller can receive the request 810. The request handler 812 can determine that the request 810 is associated with the execution agent 801, for example. The request handler can forward the request 810 (or information included in or associated with the request 810) to the execution agent 801 as a request 814. Some or all of the information in the request 810 can be provided to the stream provider 802.

If the request 810 corresponds to historic data, the request handler 812 can send the request 814 as a monitoring stream request to the execution agent 801 with a same from-timestamp and to-timestamp parameters as the request 810. The request 814 can correspond in part to a request to stream live data until a time corresponding to the first to-timestamp (e.g., if the to-timestamp is actually not specified or is a point of time in the future). The execution agent 801 can provide the stream 806 of live data to the stream provider 802. The stream provider 802 can provide the streamed data to the first request handler 812. The first request handler 812 can provide, or provide access to the streamed data to the first client 808.

The stream provider 802 can forward or otherwise make available streamed data received from the stream 806 to the request handler 812 (or, in some implementations, to the first client 808) until a time corresponding to the first to-timestamp has been reached. The request handler 812 can provide (or make available) to the first client 808 data received from the stream provider 802.

While the stream 806 is being provided to the stream provider 802, a second client 816 can send a second request 818 (including a second from-timestamp "fromTS2" and a second to-timestamp "toTS2") to the controller. A second request handler 820 included in the controller can receive the request 818 and forward the request 818 (or information included in or associated with the request 818) to the execution agent 801 as a request 822. Some or all of the information in the request 818 can be provided to the stream provider 802.

The execution agent 801 can interpret the request 822 to correspond, in part to a request to stream live data until a time corresponding to the second to-timestamp. The second to-timestamp associated with the request 818 can be a date later than a date associated with the first to-timestamp associated with the request 810, for example. The execution agent 801 can continue to send the stream 806 to the stream provider 802 after a time corresponding to the first to-timestamp has been reached and until a time corresponding to the second to-timestamp. The execution agent 801 can stop sending the stream 806 to the stream provider 802 when the date corresponding to the second to-timestamp is reached, unless another request for live data with a to-timestamp later than the second to-timestamp has been received by the execution agent 801.

The stream provider 802 can forward or otherwise make available data received from the stream 806 to the request handler 820 (or in some implementations, to the second client 816) until a time corresponding to the second to-timestamp has been reached. The request handler 820 can provide (or make available) to the second client 816 data received from the stream provider 802.

At a given point in time that is before both the first to-timestamp and the second to-timestamp, the stream provider 802 can be making available data from the stream 806 to both the first client 808 and the second client 816. The use of the stream provider 802 to handle multiple requests can lessen a processing burden of the execution agent 801, by removing a need for the execution agent 801 to provide multiple streams in response to multiple, overlapping requests.

Figure 9:
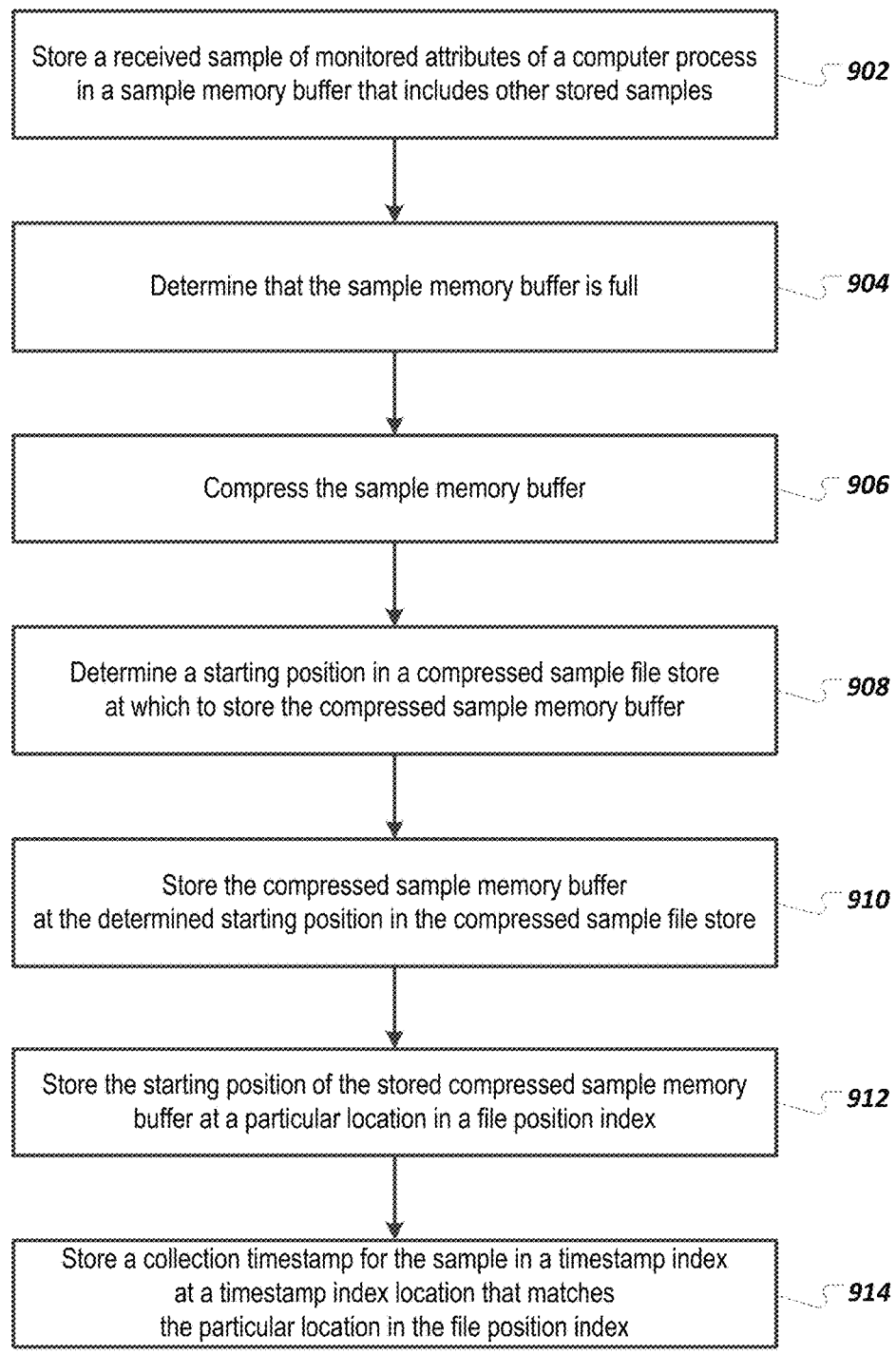
FIG. 9 is a flowchart of an example method for monitoring processes running on a platform as a service architecture.

FIG. 9 is a flowchart of an example method 900 for monitoring processes running on a platform as a service architecture. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the server 102 of FIG. 1.

At 902, a received sample of monitored attributes of a computer process is stored in a sample memory buffer that includes other stored samples. The monitored attributes can include one or more of user processing time, system processing time, native memory utilization, virtual memory utilization, socket utilization, file utilization, or thread utilization. The computer process can be a first instance, among multiple instances, of the application. As another example, the computer process can be a child process of a given instance.

At 904, a determination is made that the sample memory buffer is full.

At 906, the sample memory buffer is compressed.

At 908, a starting position in a compressed sample file store at which to store the compressed sample memory buffer is determined. The compressed sample file store can be a cyclical, rotating storage area in which oldest data is removed when capacity is reached, to make room for a newest set of data. If a compressed sample buffer does not fit into a current file of the compressed sample file store, the compressed sample buffer can be stored in a next file. For example, if the sample buffer is compressed into a newest compressed sample buffer, and the current file is full, the newest compressed sample buffer can be stored in the next file. If the maximum number of files are reached (e.g., all files are full), the newest compressed sample buffer can be written to a new file which can become the new head of the compressed sample file store and an oldest file of the compressed sample file store can be deleted.

At 910, the compressed sample memory buffer is stored at the determined starting position in the compressed sample file store.

At 912, the starting position of the stored compressed sample memory buffer is stored at a particular location in a file position index.

At 914, a collection timestamp for the sample is stored in a timestamp index at a timestamp index location that matches the particular location in the file position index. The timestamp index and the file location index can be parallel arrays.

Figure 10:
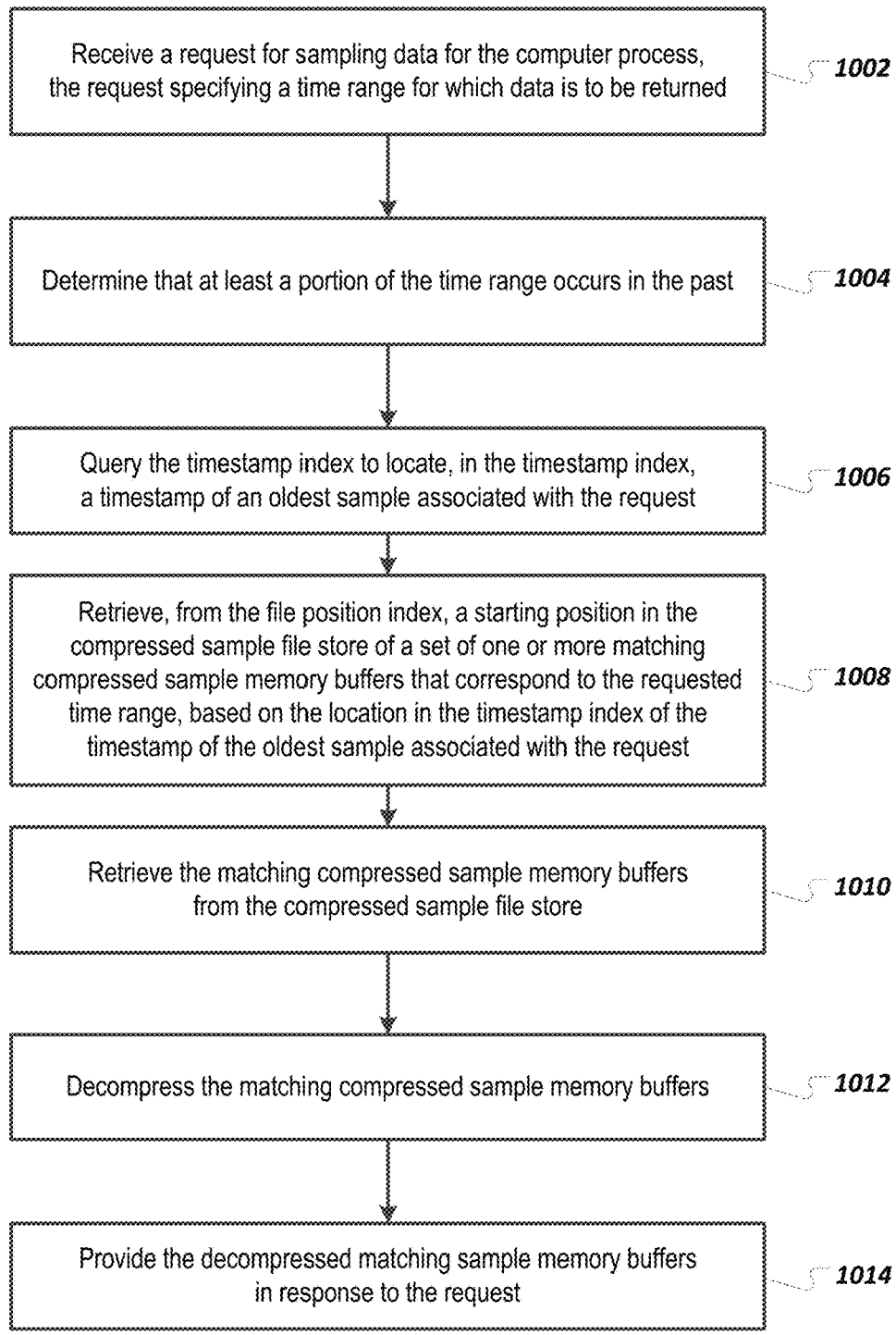
FIG. 10 is a flowchart of an example method for retrieving monitoring data.

FIG. 10 is a flowchart of an example method 1000 for retrieving monitoring data. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the server 102 of FIG. 1.

At 1002, a request is received for sampling data for the computer process. The request specifies a time range for which data is to be returned.

At 1004, a determination is made that at least a portion of the time range occurs in the past. A query can be performed to determine whether any data associated with the time range is in a current sample buffer. If data associated with the time range is in the current sample buffer, data can be retrieved from the current sample buffer.

If not all historical data is in the current sample buffer, at 1006, a timestamp index is queried to locate, in the timestamp index, a timestamp of an oldest sample associated with the request.

At 1008, a starting position in a compressed sample file store of a set of one or more matching compressed sample memory buffers that correspond to the requested time range is retrieved, from a file position index, based on the location in the timestamp index of the timestamp of the oldest sample associated with the request.

At 1010, the matching compressed sample memory buffers are retrieved from the compressed sample file store.

At 1012, the matching compressed sample memory buffers are decompressed.

At 1014, the decompressed matching sample memory buffers are provided in response to the request.

A determination can also be made that at least a portion of the time range corresponds to an active time range that starts with the current time and ends with a future time. In response to the request, samples of monitored attributes of the computer process received after the request can be streamed, until the future time. The decompressed matching historical sample memory buffers can be provided as a first stream of samples and the samples of monitored attributes of the computer process received after the request can be appended, to the first stream, and until the future time.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising an application host that includes a processor configured to execute at least one instance of at least one application, a memory area including a set of at least one sample memory buffers, a compressed sample file store, a timestamp index, a file position index, at least one computer process associated with each instance of each application, and a monitoring sampler associated with each application;

wherein the monitoring sampler for a respective application, is configured to, for each respective computer process of the application:

store a received sample of monitored attributes of the computer process in a sample memory buffer for the computer process that includes other stored samples;

determine that the sample memory buffer for the computer process is full;

compress the sample memory buffer for the computer process;

determine a starting position in the compressed sample file store at which to store the compressed sample memory buffer;

store the compressed sample memory buffer at the determined starting position in the compressed sample file store, store the starting position of the stored compressed sample memory buffer at a particular location in the file position index, and store a collection timestamp for the sample in the timestamp index at a timestamp index location that matches the particular location in the file position index;

receive a first request, from a first requester, for sampling data for the computer process, the request specifying a first time range for which data is to be returned;

in response to determining that at least a portion of the first time range occurs in the past, query the timestamp index to locate, in the timestamp index, a timestamp of an oldest sample associated with the first request;

retrieve, from the file position index, a starting position in the compressed sample file store of a set of one or more matching compressed sample memory buffers that correspond to the requested first time range, based on the location in the timestamp index of the timestamp of the oldest sample associated with the first request;

retrieve and decompress the matching compressed sample memory buffers from the compressed sample file store;

provide, in a stream, the decompressed matching sample memory buffers to the first requester in response to the first request; and while providing the stream to the first requester:

receive a second request, from a second requester, for sampling data for the computer process, the second request specifying a second time range for which data is to be returned; and in response to determining that the second time range overlaps the first time range, determine a subset of the decompressed matching sample memory buffers that correspond to an overlap of the second time range with the first time range, and simultaneously provide, in the stream, the subset of the decompressed matching sample memory buffers to both the first requester and the second requester, without making a new stream for the second request.

2. The system of claim 1, wherein the monitoring sampler is further configured to:

determine that at least a portion of the time range corresponds to an active time range that starts with the current time and ends with a future time; and stream, in the stream, until the future time, and in response to the request, samples of monitored attributes of the computer process received after the request.

3. The system of claim 2, wherein the time range represents both a time in the past and a future time and wherein the monitoring sampler is further configured to:

provide, in the stream, the decompressed matching sample memory buffers as a first stream of samples; and append, in the stream, to the first stream of samples, and until the future time, the samples of monitored attributes of the computer process received after the request.

4. The system of claim 1, wherein the timestamp index and the file location index are parallel arrays.

5. The system of claim 1, wherein the monitored attributes include one or more of user processing time, system processing time, native memory utilization, virtual memory utilization, socket utilization, file utilization, or thread utilization.

6. The system of claim 1, wherein the computer process is a first instance, among multiple instances, of the application.

7. The system of claim 6, wherein the computer process is a child process of the first instance.

8. A computer implemented method comprising:

storing a received sample of monitored attributes of a computer process in a sample memory buffer that includes other stored samples;

determining that the sample memory buffer is full;

compressing the sample memory buffer;

determining a starting position in a compressed sample file store at which to store the compressed sample memory buffer;

storing the compressed sample memory buffer at the determined starting position in the compressed sample file store, storing the starting position of the stored compressed sample memory buffer at a particular location in the file position index, and storing a collection timestamp for the sample in the timestamp index at a timestamp index location that matches the particular location in the file position index;

receiving a first request, from a first requester, for sampling data for the computer process, the request specifying a first time range for which data is to be returned;

in response to determining that at least a portion of the first time range occurs in the past, querying the timestamp index to locate, in the timestamp index, a timestamp of an oldest sample associated with the first request;

retrieving, from the file position index, a starting position in the compressed sample file store of a set of one or more matching compressed sample memory buffers that correspond to the requested first time range, based on the location in the timestamp index of the timestamp of the oldest sample associated with the first request;

retrieving and decompressing the matching compressed sample memory buffers from the compressed sample file store;

providing, in a stream, the decompressed matching sample memory buffers to the first requester in response to the first request; and while providing the stream to the first requester:
    receiving a second request, from a second requester, for sampling data for the computer process, the second request specifying a second time range for which data is to be returned; and
    in response to determining that the second time range overlaps the first time range, determining a subset of the decompressed matching sample memory buffers that correspond to an overlap of the second time range with the first time range, and simultaneously providing, in the stream, the subset of the decompressed matching sample memory buffers to both the first requester and the second requester, without making a new stream for the second request.

9. The method of claim 8, further comprising:

determining that at least a portion of the time range corresponds to an active time range that starts with the current time and ends with a future time; and streaming, in the stream, until the future time and in response to the request, samples of monitored attributes of the computer process received after the request.

10. The method of claim 9, wherein the time range represents both a time in the past and a future time, the method further comprising:

providing, in the stream, the decompressed matching sample memory buffers as a first stream of samples; and appending, in the stream, to the first stream of samples, and until the future time, the samples of monitored attributes of the computer process received after the request.

11. The method of claim 8, wherein the timestamp index and the file location index are parallel arrays.

12. The method of claim 8, wherein the monitored attributes include one or more of user processing time, system processing time, native memory utilization, virtual memory utilization, socket utilization, file utilization, or thread utilization.

13. A computer program product encoded on a non-transitory storage medium, the product comprising non-transitory, computer readable instructions for causing one or more processors to perform operations comprising:

storing a received sample of monitored attributes of a computer process in a sample memory buffer that includes other stored samples;

determining that the sample memory buffer is full;

compressing the sample memory buffer;

determining a starting position in a compressed sample file store at which to store the compressed sample memory buffer;

storing the compressed sample memory buffer at the determined starting position in the compressed sample file store, storing the starting position of the stored compressed sample memory buffer at a particular location in the file position index, and storing a collection timestamp for the sample in the timestamp index at a timestamp index location that matches the particular location in the file position index;

receiving a first request, from a first requester, for sampling data for the computer process, the request specifying a first time range for which data is to be returned;

in response to determining that at least a portion of the first time range occurs in the past, querying the timestamp index to locate, in the timestamp index, a timestamp of an oldest sample associated with the first request;

retrieving, from the file position index, a starting position in the compressed sample file store of a set of one or more matching compressed sample memory buffers that correspond to the requested first time range, based on the location in the timestamp index of the timestamp of the oldest sample associated with the first request;

retrieving and decompressing the matching compressed sample memory buffers from the compressed sample file store;

providing, in a stream, the decompressed matching sample memory buffers to the first requester in response to the first request; and while providing the stream to the first requester:
    receiving a second request, from a second requester, for sampling data for the computer process, the second request specifying a second time range for which data is to be returned; and
    in response to determining that the second time range overlaps the first time range, determining a subset of the decompressed matching sample memory buffers that correspond to an overlap of the second time range with the first time range, and simultaneously providing, in the stream, the subset of the decompressed matching sample memory buffers to both the first requester and the second requester, without making a new stream for the second request.

14. The computer program product of claim 13, the operations further comprising:

determining that at least a portion of the time range corresponds to an active time range that starts with the current time and ends with a future time; and streaming, in the stream, until the future time and in response to the request, samples of monitored attributes of the computer process received after the request.

15. The computer program product of claim 14, wherein the time range represents both a time in the past and a future time, the operations further comprising:

providing, in the stream, the decompressed matching sample memory buffers as a first stream of samples; and appending, in the stream, to the first stream of samples, and until the future time, the samples of monitored attributes of the computer process received after the request.

16. The computer program product of claim 13, wherein the timestamp index and the file location index are parallel arrays.

17. The computer program product of claim 13, wherein the monitored attributes include one or more of user processing time, system processing time, native memory utilization, virtual memory utilization, socket utilization, file utilization, or thread utilization.

* * * * *